US009679426B1

(12) United States Patent
Jones-McFadden et al.

(10) Patent No.: US 9,679,426 B1
(45) Date of Patent: Jun. 13, 2017

(54) MALFEASANCE DETECTION BASED ON IDENTIFICATION OF DEVICE SIGNATURE

(71) Applicant: Bank of America Corporation, Charlotte, NC (US)

(72) Inventors: Alicia C. Jones-McFadden, Fort Mill, SC (US); Matthew Hsieh, Charlotte, NC (US); Gail Mohr, Menlo Park, CA (US); Linda Yoon Lentz, San Jose, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/987,052

(22) Filed: Jan. 4, 2016

(51) Int. Cl.
| G08B 1/08 | (2006.01) |
| G07C 9/00 | (2006.01) |
| H04W 4/02 | (2009.01) |
| H04W 4/22 | (2009.01) |
| G06K 19/07 | (2006.01) |
| H04B 5/00 | (2006.01) |

(52) U.S. Cl.
CPC ........ G07C 9/00111 (2013.01); G06K 19/072 (2013.01); H04B 5/0062 (2013.01); H04W 4/021 (2013.01); H04W 4/22 (2013.01)

(58) Field of Classification Search
CPC G07C 9/00111; H04B 5/0062; G06K 19/072; H04W 4/22; H04W 4/021
USPC ........ 340/539.13, 539.12; 705/23, 14.58, 44, 705/2, 14.66, 14.73, 39, 26.35, 40; 707/769, 736, 607
See application file for complete search history.

(56) References Cited

U.S. PATENT DOCUMENTS

| 5,642,279 A | 6/1997 | Bloomberg et al. |
| 5,948,040 A | 9/1999 | DeLorme et al. |
| 6,026,370 A | 2/2000 | Jermyn |
| 6,112,190 A | 8/2000 | Fletcher et al. |
| 6,199,754 B1 | 3/2001 | Epstein |
| 6,430,539 B1 | 8/2002 | Lazarus et al. |
| 6,845,361 B1 | 1/2005 | Dowling |
| 6,999,943 B1 | 2/2006 | Johnson et al. |
| 7,050,997 B1 | 5/2006 | Wood, Jr. |
| 7,319,479 B1 | 1/2008 | Crabtree et al. |
| 7,379,922 B2 | 5/2008 | Pericle |
| 7,428,988 B1 | 9/2008 | Starr |
| 7,437,330 B1 | 10/2008 | Robinson et al. |
| 7,533,038 B2 | 5/2009 | Blume et al. |
| 7,606,750 B1 | 10/2009 | Hoag et al. |

(Continued)

OTHER PUBLICATIONS

Citi Begins Offering Customers Contactless-Payment Stickers PaymentsSource 1 Thursday, Jun. 10, 2010 by Will Hernandez.

(Continued)

*Primary Examiner* — Dhaval Patel
(74) *Attorney, Agent, or Firm* — Michael A. Springs; Moore & Van Allen PLLC; William K. Ransom

(57) ABSTRACT

Systems, methods, and computer program products are described herein that provide for notifying a malfeasance specialist of a malfeasance detection based on identification of a device signature. Monitoring devices may monitor devices in a location for device signatures that are known to be associated with malfeasance. Upon detecting the presence of a device signature associated with malfeasance, a specialist may be notified of the detection so that the specialist may take appropriate actions in response to the detection.

17 Claims, 3 Drawing Sheets

(56) References Cited

U.S. PATENT DOCUMENTS

| | | |
|---|---|---|
| 7,624,073 B1 | 11/2009 | Robinson et al. |
| 7,637,426 B1 | 12/2009 | Green |
| 7,644,079 B2 | 1/2010 | Sastry et al. |
| 7,665,658 B2 | 2/2010 | Fields |
| 7,668,821 B1 | 2/2010 | Donsbach et al. |
| 7,707,089 B1 | 4/2010 | Barton et al. |
| 7,712,657 B1 | 5/2010 | Block et al. |
| 7,740,172 B1 | 6/2010 | Hubert et al. |
| 7,756,926 B2 | 7/2010 | Tseng et al. |
| 7,778,769 B2 | 8/2010 | Boss et al. |
| 7,778,933 B2 | 8/2010 | Robinson et al. |
| 7,788,151 B2 | 8/2010 | Pizzi et al. |
| 7,801,758 B2 | 9/2010 | Gracie et al. |
| 7,814,016 B2 | 10/2010 | Pranger |
| 7,856,403 B2 | 12/2010 | Venturo et al. |
| 7,870,069 B2 | 1/2011 | Steele et al. |
| 7,941,344 B1 | 5/2011 | Bickerstaff |
| 7,941,368 B2 | 5/2011 | Chang et al. |
| 7,954,708 B2 | 6/2011 | Blossom |
| 7,966,329 B1 | 6/2011 | Rukonic et al. |
| 7,974,867 B2 | 7/2011 | Gracie et al. |
| 8,005,753 B2 | 8/2011 | Davis |
| 8,006,900 B2 | 8/2011 | Grigsby et al. |
| 8,027,891 B2 | 9/2011 | Preston et al. |
| 8,046,260 B2 | 10/2011 | Haddad et al. |
| 8,060,423 B1 | 11/2011 | Rukonic et al. |
| 8,073,460 B1 | 12/2011 | Scofield et al. |
| 8,090,656 B2 | 1/2012 | Solomon et al. |
| 8,091,778 B1 | 1/2012 | Block et al. |
| 8,096,470 B2 | 1/2012 | Mink |
| 8,122,020 B1 | 2/2012 | Donsbach et al. |
| 8,132,720 B2 | 3/2012 | Dyor |
| 8,170,932 B1 | 5/2012 | Krakowiecki et al. |
| 8,175,961 B2 | 5/2012 | Reid et al. |
| 8,180,682 B2 | 5/2012 | Narayanaswami et al. |
| 8,181,789 B2 | 5/2012 | Casella et al. |
| 8,229,806 B1 | 7/2012 | Chapman et al. |
| 8,255,268 B2 | 8/2012 | Rane et al. |
| 8,285,622 B1 | 10/2012 | Rao et al. |
| 8,296,229 B1 | 10/2012 | Yellin et al. |
| 8,332,288 B2 | 12/2012 | Preston et al. |
| 8,335,728 B1 | 12/2012 | Dahodwala et al. |
| 8,346,664 B1 | 1/2013 | Klieman et al. |
| 8,359,274 B2 | 1/2013 | Yoder et al. |
| 8,380,590 B1 | 2/2013 | Rukonic et al. |
| 8,429,277 B2 | 4/2013 | Dale et al. |
| 8,447,674 B2 | 5/2013 | Choudhuri et al. |
| 8,478,691 B2 | 7/2013 | Solomon et al. |
| 8,504,423 B2 | 8/2013 | Rotbard et al. |
| 8,583,549 B1 | 11/2013 | Mohsenzadeh |
| 8,650,123 B2 | 2/2014 | Summerrow et al. |
| 8,694,456 B2 | 4/2014 | Grigg et al. |
| 8,706,587 B1 | 4/2014 | Bautista, Jr. et al. |
| 8,725,569 B2 | 5/2014 | Liang et al. |
| 8,856,121 B2 | 10/2014 | Makki et al. |
| 8,861,804 B1 | 10/2014 | Johnson et al. |
| 8,892,461 B2 | 11/2014 | Lau et al. |
| 8,930,204 B1 | 1/2015 | Igoe et al. |
| 8,949,013 B2 | 2/2015 | Yang et al. |
| 9,002,730 B2 | 4/2015 | Postrel |
| 9,112,850 B1 | 8/2015 | Eisen |
| 9,123,045 B2 | 9/2015 | Burrell |
| 2001/0037315 A1 | 11/2001 | Saliba et al. |
| 2002/0035541 A1 | 3/2002 | Makino et al. |
| 2002/0095333 A1 | 7/2002 | Jokinen et al. |
| 2002/0099649 A1 | 7/2002 | Lee et al. |
| 2002/0099657 A1 | 7/2002 | Black et al. |
| 2003/0055733 A1 | 3/2003 | Marshall et al. |
| 2003/0065805 A1 | 4/2003 | Barnes, Jr. |
| 2003/0076849 A1 | 4/2003 | Morgan et al. |
| 2003/0105685 A1 | 6/2003 | Millikan |
| 2003/0105710 A1 | 6/2003 | Barbara et al. |
| 2003/0107649 A1 | 6/2003 | Flickner et al. |
| 2003/0212620 A1 | 11/2003 | Blagg |
| 2004/0006533 A1 | 1/2004 | Lawrence |
| 2004/0122736 A1 | 6/2004 | Strock et al. |
| 2004/0243468 A1 | 12/2004 | Cohagan et al. |
| 2005/0021478 A1 | 1/2005 | Gautier et al. |
| 2005/0033664 A1 | 2/2005 | Moon et al. |
| 2005/0039214 A1 | 2/2005 | Lorenz et al. |
| 2005/0125317 A1 | 6/2005 | Winkelman, III et al. |
| 2005/0171799 A1 | 8/2005 | Hull et al. |
| 2005/0177385 A1 | 8/2005 | Hull et al. |
| 2005/0209921 A1 | 9/2005 | Roberts et al. |
| 2005/0228766 A1 | 10/2005 | Roberts et al. |
| 2006/0149674 A1 | 7/2006 | Cook et al. |
| 2006/0207856 A1 | 9/2006 | Dean et al. |
| 2006/0265339 A1 | 11/2006 | Vakil et al. |
| 2006/0271431 A1 | 11/2006 | Wehr et al. |
| 2006/0273153 A1 | 12/2006 | Ashby et al. |
| 2007/0032244 A1 | 2/2007 | Counts et al. |
| 2007/0038565 A1 | 2/2007 | Bartz et al. |
| 2007/0055554 A1 | 3/2007 | Sussman et al. |
| 2007/0095892 A1 | 5/2007 | Lyons et al. |
| 2007/0127691 A1 | 6/2007 | Lert, Jr. |
| 2007/0219852 A1 | 9/2007 | Anglum |
| 2007/0244741 A1 | 10/2007 | Blume et al. |
| 2007/0255854 A1 | 11/2007 | Khosravy et al. |
| 2007/0260532 A1 | 11/2007 | Blake, III |
| 2007/0288355 A1 | 12/2007 | Roland et al. |
| 2008/0082349 A1 | 4/2008 | Zackrison et al. |
| 2008/0091528 A1 | 4/2008 | Rampell et al. |
| 2008/0120125 A1 | 5/2008 | Chavez |
| 2008/0140509 A1 | 6/2008 | Amjadi |
| 2008/0162268 A1 | 7/2008 | Gilbert |
| 2008/0167887 A1 | 7/2008 | Marcken |
| 2008/0183579 A1 | 7/2008 | Avner |
| 2008/0262928 A1 | 10/2008 | Michaelis |
| 2008/0300956 A1 | 12/2008 | Nishikawa et al. |
| 2009/0024484 A1 | 1/2009 | Walker et al. |
| 2009/0045251 A1 | 2/2009 | Jaiswal et al. |
| 2009/0076875 A1 | 3/2009 | Lert, Jr. et al. |
| 2009/0119371 A1 | 5/2009 | Chang et al. |
| 2009/0125230 A1 | 5/2009 | Sullivan |
| 2009/0125598 A1 | 5/2009 | Sun et al. |
| 2009/0157307 A1 | 6/2009 | Krumm et al. |
| 2009/0164267 A1 | 6/2009 | Banatwala et al. |
| 2009/0192892 A1 | 7/2009 | Cason |
| 2009/0216551 A1 | 8/2009 | Chen et al. |
| 2009/0222364 A1 | 9/2009 | McGlynn et al. |
| 2009/0252318 A1 | 10/2009 | Smith et al. |
| 2009/0265197 A1 | 10/2009 | Chan |
| 2009/0271287 A1 | 10/2009 | Halpern |
| 2009/0307003 A1 | 12/2009 | Benyamin et al. |
| 2009/0324103 A1 | 12/2009 | Gelfand et al. |
| 2010/0005400 A1 | 1/2010 | Swift |
| 2010/0057574 A1 | 3/2010 | Banerjee et al. |
| 2010/0057620 A1 | 3/2010 | Li et al. |
| 2010/0058196 A1 | 3/2010 | Krishnan et al. |
| 2010/0082454 A1 | 4/2010 | Narayanaswami et al. |
| 2010/0100693 A1 | 4/2010 | Kerley et al. |
| 2010/0131340 A1 | 5/2010 | Brown et al. |
| 2010/0145836 A1 | 6/2010 | Baker et al. |
| 2010/0151821 A1 | 6/2010 | Sweeney et al. |
| 2010/0153242 A1 | 6/2010 | Preston et al. |
| 2010/0161379 A1 | 6/2010 | Bene et al. |
| 2010/0161600 A1 | 6/2010 | Higgins et al. |
| 2010/0174709 A1 | 7/2010 | Hansen et al. |
| 2010/0191581 A1 | 7/2010 | Furin et al. |
| 2010/0211499 A1 | 8/2010 | Zanzot et al. |
| 2010/0211535 A1 | 8/2010 | Rosenberger |
| 2010/0217525 A1 | 8/2010 | King et al. |
| 2010/0241519 A1 | 9/2010 | Lindahl et al. |
| 2010/0241559 A1 | 9/2010 | O'Connor et al. |
| 2010/0250419 A1 | 9/2010 | Ariff et al. |
| 2010/0250420 A1 | 9/2010 | Ariff et al. |
| 2010/0250421 A1 | 9/2010 | Ariff et al. |
| 2010/0250430 A1 | 9/2010 | Ariff et al. |
| 2010/0268629 A1 | 10/2010 | Ross et al. |
| 2010/0268645 A1 | 10/2010 | Martino et al. |
| 2010/0287196 A1* | 11/2010 | Shields ............ G06F 17/30781 707/769 |
| 2011/0004497 A1 | 1/2011 | Mortimore, Jr. et al. |
| 2011/0014905 A1 | 1/2011 | Eschenauer et al. |

(56) References Cited

U.S. PATENT DOCUMENTS

| | | |
|---|---|---|
| 2011/0035681 A1 | 2/2011 | Mandel et al. |
| 2011/0040665 A1 | 2/2011 | Long |
| 2011/0055081 A1 | 3/2011 | Vasten |
| 2011/0083101 A1 | 4/2011 | Sharon et al. |
| 2011/0087674 A1 | 4/2011 | Schokking et al. |
| 2011/0099045 A1 | 4/2011 | Carr et al. |
| 2011/0137689 A1 | 6/2011 | Chua et al. |
| 2011/0153312 A1 | 6/2011 | Roberts |
| 2011/0166911 A1 | 7/2011 | Newman et al. |
| 2011/0184823 A1 | 7/2011 | Phillips |
| 2011/0196863 A1 | 8/2011 | Marcucci et al. |
| 2011/0208586 A1 | 8/2011 | Joa et al. |
| 2011/0208588 A1 | 8/2011 | Joa et al. |
| 2011/0211764 A1 | 9/2011 | Krupka et al. |
| 2011/0238478 A1 | 9/2011 | Gottfurcht et al. |
| 2011/0302057 A1 | 12/2011 | Karon et al. |
| 2011/0320294 A1 | 12/2011 | Votaw et al. |
| 2012/0047003 A1 | 2/2012 | Hammad et al. |
| 2012/0059576 A1 | 3/2012 | Lee et al. |
| 2012/0066064 A1 | 3/2012 | Yoder et al. |
| 2012/0101829 A1 | 4/2012 | Hunt |
| 2012/0130870 A1 | 5/2012 | Shergill et al. |
| 2012/0140993 A1 | 6/2012 | Bruso et al. |
| 2012/0143674 A1 | 6/2012 | Ziskrout et al. |
| 2012/0143755 A1 | 6/2012 | Burrell |
| 2012/0143931 A1 | 6/2012 | Rosenberger et al. |
| 2012/0150736 A1 | 6/2012 | Dickerson et al. |
| 2012/0159647 A1 | 6/2012 | Sanin et al. |
| 2012/0166311 A1 | 6/2012 | Dwight et al. |
| 2012/0191606 A1 | 7/2012 | Milne |
| 2012/0209719 A1 | 8/2012 | Plut |
| 2012/0209720 A1 | 8/2012 | Plut |
| 2012/0209775 A1 | 8/2012 | Milne |
| 2012/0215597 A1 | 8/2012 | Ross |
| 2012/0215604 A1 | 8/2012 | Canetto |
| 2012/0215615 A1 | 8/2012 | Moredock |
| 2012/0221388 A1 | 8/2012 | Ross |
| 2012/0229657 A1 | 9/2012 | Calman et al. |
| 2012/0239485 A1 | 9/2012 | Hu et al. |
| 2012/0271691 A1 | 10/2012 | Hammad et al. |
| 2012/0281094 A1 | 11/2012 | Forshaw |
| 2012/0290389 A1 | 11/2012 | Greenough et al. |
| 2012/0290431 A1 | 11/2012 | Tedjamulia et al. |
| 2012/0296768 A1 | 11/2012 | Fremont-Smith et al. |
| 2012/0310764 A1 | 12/2012 | Sinsheimer et al. |
| 2012/0330971 A1 | 12/2012 | Thomas et al. |
| 2013/0006742 A1 | 1/2013 | Richard |
| 2013/0013516 A1 | 1/2013 | Hamilton |
| 2013/0013689 A1 | 1/2013 | Crawford |
| 2013/0027561 A1 | 1/2013 | Lee et al. |
| 2013/0030925 A1 | 1/2013 | Calman et al. |
| 2013/0030994 A1 | 1/2013 | Calman et al. |
| 2013/0041819 A1 | 2/2013 | Khasho |
| 2013/0046591 A1 | 2/2013 | Yao |
| 2013/0046602 A1 | 2/2013 | Grigg et al. |
| 2013/0046603 A1 | 2/2013 | Grigg et al. |
| 2013/0046626 A1 | 2/2013 | Grigg et al. |
| 2013/0046702 A1 | 2/2013 | Ross et al. |
| 2013/0066964 A1 | 3/2013 | Odio et al. |
| 2013/0073377 A1 | 3/2013 | Heath |
| 2013/0073473 A1 | 3/2013 | Heath |
| 2013/0080239 A1 | 3/2013 | Okerlund |
| 2013/0080922 A1 | 3/2013 | Elias et al. |
| 2013/0117184 A1 | 5/2013 | Ciurea |
| 2013/0117695 A1 | 5/2013 | Hammoud |
| 2013/0178190 A1 | 7/2013 | Celi, Jr. et al. |
| 2013/0211913 A1 | 8/2013 | Ross |
| 2013/0246342 A1 | 9/2013 | Faith et al. |
| 2013/0265432 A1 | 10/2013 | Freedman et al. |
| 2013/0346311 A1 | 12/2013 | Boding et al. |
| 2014/0081750 A1 | 3/2014 | Hosp |
| 2014/0089070 A1 | 3/2014 | Stockwell et al. |
| 2014/0101012 A1 | 4/2014 | Kuznetsov |
| 2014/0122467 A1 | 5/2014 | Mandel et al. |
| 2014/0129357 A1 | 5/2014 | Goodwin |
| 2014/0153400 A1 | 6/2014 | Lee et al. |
| 2014/0156506 A1 | 6/2014 | Grigg et al. |
| 2014/0164178 A1 | 6/2014 | Adjaoute |
| 2014/0164223 A1 | 6/2014 | Grigg et al. |
| 2014/0164224 A1 | 6/2014 | Grigg et al. |
| 2014/0222684 A1 | 8/2014 | Felsher |
| 2014/0250126 A1* | 9/2014 | Baldwin ............ G06F 17/3028 707/737 |
| 2014/0278212 A1 | 9/2014 | Torgersrud et al. |
| 2014/0279068 A1* | 9/2014 | Systrom ............ G06Q 30/0277 705/14.73 |
| 2014/0279303 A1 | 9/2014 | van Dam et al. |
| 2014/0289210 A1 | 9/2014 | Taank et al. |
| 2014/0316829 A1 | 10/2014 | Bumbernick |
| 2014/0358727 A1 | 12/2014 | Shannon et al. |
| 2015/0019409 A1 | 1/2015 | Vagiri |
| 2015/0032638 A1 | 1/2015 | Dintenfass et al. |
| 2015/0039513 A1 | 2/2015 | Adjaoute |
| 2015/0088679 A1 | 3/2015 | Votaw et al. |
| 2015/0088704 A1 | 3/2015 | Votaw et al. |
| 2015/0088705 A1 | 3/2015 | Votaw et al. |
| 2015/0088712 A1 | 3/2015 | Votaw et al. |
| 2015/0088713 A1 | 3/2015 | Votaw et al. |
| 2015/0088714 A1 | 3/2015 | Votaw et al. |
| 2015/0088715 A1 | 3/2015 | Votaw et al. |
| 2015/0088716 A1 | 3/2015 | Votaw et al. |
| 2015/0088717 A1 | 3/2015 | Votaw et al. |
| 2015/0088718 A1 | 3/2015 | Votaw et al. |
| 2015/0088915 A1 | 3/2015 | Votaw et al. |
| 2016/0210450 A1* | 7/2016 | Su ..................... G06F 21/316 |

OTHER PUBLICATIONS

Citi Launches Contactless Credit Sticker Published: May 26, 2010 NFC Times.

How Issuers Can Deliver Mobile Payments Today: A Guide for Contactless Sticker Issuance an Issuer White Paper Discover® New Technologies Nov. 2009.

GO-Tag™ Visa® Prepaid Debit Card & Sticker Frequently Asked Questions.

How do I activate credit cards? by Astrella Hunt on Jun. 9, 2010.

Starbucks Launches iPhone Apps Sep. 22, 2009 by KC Maclaren.

SoCal Credit Card; Received and Activated WaMU Credit Card; Saturday May 31, 2008.

SoCal2 Saturday, May 31, 2008.

Sheetz Offers GO-Tag Contactless Payment Sticker, Jun. 26, 2009.

WaMu Tap & Go (TM) with your new Debit MasterCard; retrieved on Feb. 6, 2013.

* cited by examiner

US 9,679,426 B1

MALFEASANCE DETECTION BASED ON IDENTIFICATION OF DEVICE SIGNATURE

FIELD OF THE INVENTION

This disclosure generally relates to notifying a specialist of a malfeasance detection based on identification of a device signature.

BACKGROUND

Many common smart devices, such as smart phones, smart watches, and chip-enabled cards by individuals, include device signatures that provide unique identification information about its respective device. These device signatures can be monitored within an area such that a monitoring device may detect the presence of the device and the content of the device signature. When a device signature is detected in conjunction with a malfeasance act, an entity may associate the device signature with the malfeasance for future monitoring. Therefore, an entity may monitor devices in a certain area to detect a device signature associated with malfeasance such that the entity may notify a malfeasance specialist capable of taking appropriate actions in response to the detected device signature.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for notifying a specialist of a malfeasance detection based on identification of a device signature. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention comprise providing a computing system comprising a computer processing device and a non-transitory computer readable medium, where the computer readable medium comprises configured computer program instruction cone, such that when said instruction code operated by said computer processing device, said computer processing device performing certain operations to carry out the invention.

For sample, illustrative purposes, system environments will be summarized. The system may involve storing a plurality of device signatures associated with malfeasance. Additionally, the system may comprise monitoring a first location for device signatures and detecting a first device signature associated with a first device. The system may further comprise comparing the first device signature with the plurality of device signatures associated with malfeasance to determine that the first device signature matches at least one of the plurality of device signatures associated with malfeasance. In some embodiments, the system provides a notification to a malfeasance specialist of a presence of the first device at the first location.

In some embodiments, a device associated with the plurality of device signatures and the first device signature comprise one or more mobile devices and one or more cards with near-field-communication (NFC) capabilities. In some such embodiments, monitoring a first location for device signatures comprises pinging a geographical location associated with the first location to detect mobile device signatures of a plurality of mobile devices located in the geographical location. In other such embodiments, monitoring the first location for device signatures comprises searching for card signatures of a plurality of cards located in the geographical location with one or more NFC readers located in the geographical location.

In some embodiments of the system, providing a notification to the malfeasance specialist comprises displaying a notification on a specialist device associated with the malfeasance specialist. In some embodiments of the system, providing a notification to the malfeasance specialist comprises emitting an audible alarm from a specialist device associated with the malfeasance specialist.

Some embodiments of the system comprise prompting a user associated with the first device to provide a higher level of authorization credentials than an ordinary level of authorization credentials.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
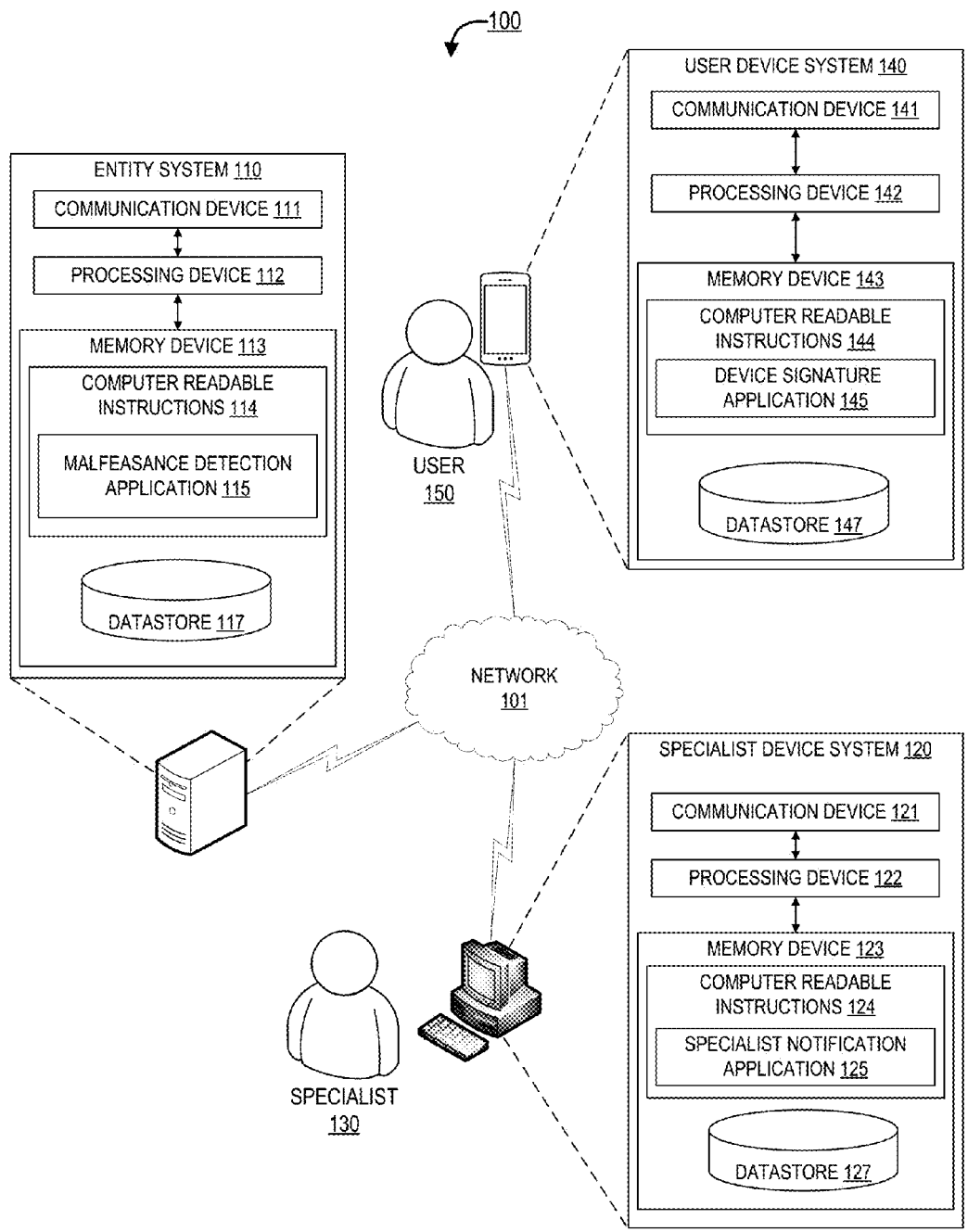
Figure 2:
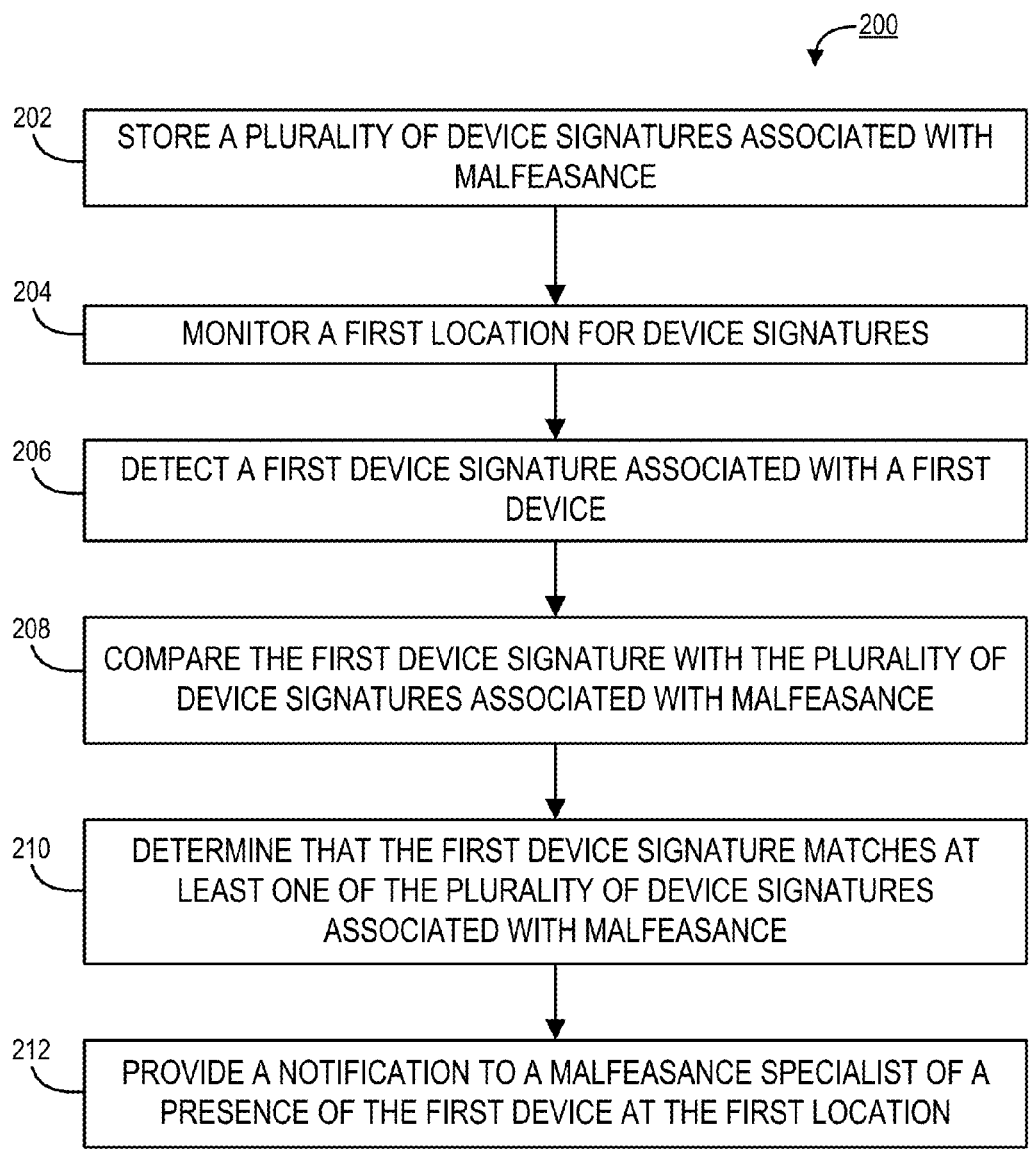
Figure 3:
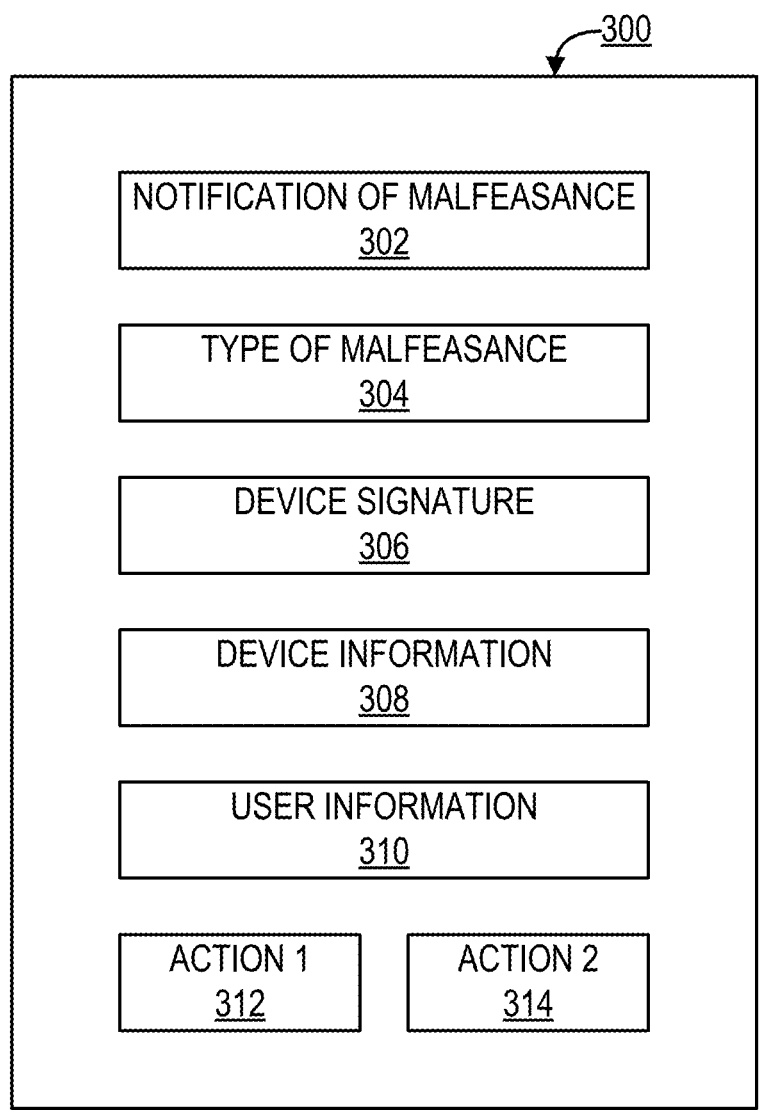

Having thus described embodiments of the invention in general terms, reference will now be made to the accompanying drawings, which are not necessarily drawn to scale, and wherein:

FIG. 1 is a block diagram of a system environment for notifying a specialist of a malfeasance detection based on an identification of a device signature, in accordance with an embodiment of the invention;

FIG. 2 is a general process flow for notifying a specialist of a malfeasance detection based on an identification of a device signature, in accordance with an embodiment of the invention; and FIG. 3 is a sample display interface for notifying a specialist of a malfeasance detection based on an identification of a device signature, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Various embodiments or features will be presented in terms of systems that may include a number of devices, components, modules, and the like. It is to be understood and appreciated that the various systems may include additional devices, components, modules, and the like, and/or may not include all of the devices, components, modules, and the like, discussed in connection with the figures. A combination of these approaches may also be used.

A "system environment," as used herein, may refer to any information technology platform of an enterprise (e.g., a national or multi-national corporation), and may include a multitude of servers, machines, mainframes, personal computers, network devices, front and back end systems, database systems and/or the like.

As used herein, an "entity" may be any business, organization, or individual that owns, operates, or is otherwise associated with a federated authentication system. Although some embodiments of the invention described herein are generally described as involving an "entity," other embodiments of the invention may involve business institutions that take the place of or work in conjunction with the entity. As used herein, the term "specialist" or "malfeasance specialist" refers to a person who is affiliated with an entity herein defined and is specially trained to handle a particular aspect of a business process of the entity.

As used herein, the term "user" refers to an individual associated with a device. In some embodiments, a user is an individual that is associated with the entity, such that the entity provides goods and/or services to the user. In some embodiments, the user is not associated with the entity, but may still have access to a location owned or operated by the entity.

Thus, systems, methods, and computer program products are described herein that provide for notifying a malfeasance specialist of a malfeasance detection based on identification of a device signature.

Referring now to FIG. 1, a block diagram of a system environment 100 is provided, which includes an entity system 110, a specialist device system 120 associated with a specialist 130, a user device system 140 associated with a user 150, and a network 101. The entity system 110, the specialist device system 120, and the user device system 140 communicate with one another over the network 101.

As shown in FIG. 1, the entity system 110 includes a communication device 111, at least one processing device 112, and at least one memory device 113, in communication with the processing device 112. The memory device 113 contains computer readable instructions 114 including a malfeasance detection application 115. Additionally, the memory device 113 includes a datastore 117 for storing device signature data, user 150 information data, and/or specialist 130 information data.

The specialist device system 120 includes a communication device 121 a processing device 122, and at least one memory device 123, in communication with the processing device 122. The memory device 123 contains computer readable instructions 124 including a specialist notification application 125. Additionally, the memory device 123 includes a datastore 127 for storing device signature data, user 150 information data, and/or specialist 130 information data. The specialist device system 120 can be one or more personal computers, electronic notebooks, desktops, mobile device, or any computing device having network capability and in communication with the entity system 110 and the user device system 140 through the network 101. In some embodiments, the computing devices of the specialist device system 120 may be one or more specialized computing devices that perform specific functions of the invention as described herein.

In some cases, a specialist interface is provided by the entity and can be installed on the specialist device system 120, as part of a specialist-side application, which, as shown in FIG. 1, is the specialist notification application 125, also provided by the entity. The specialist interface can be launched by running the specialist notification application 125 that communicates with the entity system 110 and the user device system 140 via the network 101. In some embodiments, the specialist interface is part of a server-side specialist notification application 125, built on the entity system 110, and can be presented to the specialist through a web browser by invoking the server-side application. A specialist-side application generally means that the application is stored and executed on the specialist's computer; while a server-side application means that the application runs on a server's computer, which, in the present incident, is the entity system 110 that communicates with the specialist device system 120 through the network 101.

The user device system 140 includes a communication device 141 a processing device 142, and at least one memory device 143, in communication with the processing device 142. The memory device 143 contains computer readable instructions 144 including a device signature application 145. Additionally, the memory device 143 includes a datastore 147 for storing device signature data, user 150 information data, and/or specialist 130 information data. The user device system 140 can be one or more personal computers, electronic notebooks, mobile devices, or any computing device having network capability. As shown in FIG. 1, the user device system 140 may be in communication with the entity system 110 and the user device system 140 through the network 101. However, it should be noted that in some embodiments, the user device system 140 is not directly in communication with the entity system 110 or the specialist device system 120, but does emit a signature either automatically or in response to a ping or request from the entity system 110.

As used herein, the processing devices 112, 122, and 142 include circuitry for executing the functions of the entity system 110, the specialist device system 120, and the user device system 140. For example, each of the processing devices 112, 122, and 142 can include a digital signal processor device, a microprocessor device, and various analog-to-digital converters, digital-to-analog converters, and other support circuits. Control and signal processing functions of the entity system 110, the specialist device system 120, and the user device system 140, in which the processing devices 112, 122, and 142 reside, may be allocated between these devices according to their respective capabilities. The processing devices 112, 122, and 142 also include functionality to operate one or more software programs based on computer-executable program code portions thereof, which may be stored, along with the computer readable instructions 114, 124, in the memory devices 113, 123 on the entity system 110, the specialist device system 120, and the user device system 140.

The memory devices 113, 123, and 143, as described herein, store the computer readable instructions 114, 124, and 144 and the datastores 117, 127, and 147. In some embodiments, the memory devices 113, 123, and 143 may include volatile memory, such as RAM having a cache area for the temporary storage of information. The memory devices 113, 123, and 143 may also include non-volatile memory that may be embedded and/or removable. The non-volatile memory may additionally or alternatively include an Electrically Erasable Programmable Read-Only Memory (EEPROM), flash memory, and/or the like. The memory devices 113, 123, and 143 can store any information and data that are used and administrated by the entity system 110, the specialist device system 120, and the user device system 140 to implement the functions thereof.

In some embodiments, the malfeasance detection application 115 is configured to use the communication device 111, the processing device 112, and the datastore 117 of the entity system 110 to send and receive commands and instructions regarding searching or monitoring an area for device signatures associated with malfeasance and alerting specialists (e.g., specialist 130) of the detection of a device associated with malfeasance.

In some embodiments, the specialist notification application 125 utilizes the communication device 121, the processing device 122, and the datastore 127 of the specialist device system 120 to send and receive commands and instructions regarding alerting the specialist 130 of the detection of a device associated with malfeasance and any subsequent steps necessary to addressing this detection.

In some embodiments, the device signature application 145 utilizes the communication device 141, the processing device 142, and the datastore 147 of the user device system 140 to transmit, present, or otherwise disclose a device signature associated with a device of the user 150.

Turning now to FIG. 2, a general process flow 200 is provided for notifying a specialist of a malfeasance detection based on identification of a device signature. The process 200 includes block 202 of storing a plurality of device signatures associated with malfeasance. As mentioned above, device signatures are unique identification numbers, codes, and the like, that are each associated with a specific device such as a mobile device, a wearable device (e.g., a smart watch, smart implant, smart glasses, and the like), cards that are enhanced with electronic chips, and the like. When the entity determines that a device signature has been used in association with malfeasance, or is associated with a user that is known or suspected to be associated with malfeasance, then this device signature is recorded and stored with other device signatures associated with malfeasance.

The device signatures associated with malfeasance may be stored in a datastore such as datastore 117 of the entity system 110 or datastore 127 of the specialist device system 120. The entity associated with the system may record and accumulate device signatures as they become associated with malfeasance, thereby creating a listing of device signatures that are related to malfeasance in some manner. The stored device signatures may be of the same data type (e.g., device signatures associated with mobile phones of users that are associated with malfeasance). However, the stored device signatures may be comprised of several data types (e.g., mobile phone device signatures, wearable device signatures, electronically chipped card device signatures, and the like). As such, the system may be able to monitor and/or search for device signatures across a plurality of device types and more effectively implement the invention.

The device signatures may be stored with additional device signature information, such as information for a user associated with the device signature, the type of malfeasance that is associated with the device, a number of times that the device signature and/or the user has been associated with each type of malfeasance, a last known date of malfeasance associated with the device signature, and the like. As such, the system may keep information that is relevant to the malfeasance nature of the device in an easily accessible location to enable relatively easy analysis at a later point in time.

The process 200 may also include block 204, where the system monitors a first location for device signatures. This first location may be a physical location such as an office building, kiosk, property area, and the like. The first location may also be a location of a device such as a point of sale terminal, an automated teller machine, a sensor, and the like. Monitoring the first location for device signatures may involve pinging any device in a geographical region including at least a part of the first location and receiving responses from devices that include at least the device signature. These devices may or may not be known to the system at the time that the system pings the geographical area. For example, a user may have a mobile device located in a pocket or purse such that the device is not visible, but the system may transmit a ping, or message, over a common network (e.g., the network 101, and/or a wi-fi network, a local area network (LAN), a wide area network (WAN), and the like). The device of the user may receive this message and transmit a response back to the system that includes the device signature of that device. As such, the system may include a monitoring device capable of pinging devices over the network 101, receiving responses from the devices that include the device signatures, and communicating these device signatures to the system.

Monitoring the first location for device signatures may involve using other wireless communication techniques such as near field communication (NFC) or radio frequency identification (RFID). These wireless communication techniques may be used in monitoring card devices that include integrated chips (e.g., an NFC chip, a passive RFID chip, an active RFID chip, and the like). Sensors or point of sale devices may be equipped to monitor a small region for the presence of such chips, whereby the presence of a card with a chip causes the sensors or point of sale devices to retrieve device signature information from the chips of the cards. In some embodiments, the process of monitoring cards devices with integrated chips involves the user presenting the card device at a sensor of point of sale device of the system. In other embodiments, the sensors or point of sale devices actively monitor for such card devices without requiring the user to knowingly present the card device.

The system may continuously monitor the first location for device signatures such that any device that enters the area will immediately be detected by the system. In some embodiments, the system monitors the location when prompted to by a specialist, a user, or some other entity associated with the system. The system may additionally, or alternatively, monitor the first location for device signatures on a periodic basis (e.g., every second, every few seconds, every minute, every few minutes, every hour, and the like).

In some embodiments, the system monitors multiple regions of the first location. For example, a first side of a room may be monitored by a first monitoring device while a second side of the room may be monitored by a second monitoring device. Furthermore, different floors of a building may be monitored by different monitoring devices. The same region may also be monitored by more than one monitoring device, where each monitoring device utilizes a different monitoring technique.

In some embodiments, the process 200 includes block 206, where the system detects a first device signature associated with a first device. When a device is present in the monitored location, the system receives the device signature associated with the device and may transmit this device signature and any other associated information for the device to a datastore and/or processor of the system. The system may transmit and/or store the device signature information automatically so the system can quickly analyze the device signature information to determine whether the device signature is associated with malfeasance. In some embodiments, the system transmits and/or stores the device signature information on a periodic basis (e.g., every second, every few seconds, every minute, and the like), so the system can analyze the device signature in a timely manner. The system may store all device signature information for subsequent analysis. For example, device signatures that are not determined to be associated with malfeasance may be labeled as cleared and stored in a "cleared" database for future use.

The process 200 may also include block 208, where the system compares the first device signature with the plurality of device signatures associated with malfeasance. As such, the system may compare the detected first device signature with each device signature in a database of device signatures associated with malfeasance to determine if the first device signature is identical or substantially similar to one of the device signatures associated with malfeasance.

In some embodiments, the process 200 includes block 210, where the system determines that the first device signature matches at least one of the plurality of device signatures associated with malfeasance. As mentioned above, this determination may be based on a match between the detected first device signature and one of the stored device signatures associated with malfeasance. However, in some embodiments, the system may consider a device signature as potentially being associated with malfeasance based on a failure of the system to match the device signature with a database of cleared device signatures. Additionally, a device signature that is not matched with a cleared device signature may be identified as a device associated with a user that is not currently a customer of the entity. As such, the system may determine that one or more products of the entity should be offered to the user of this device. In some embodiments, the system may establish an electronic communication channel with the detected device and prompt a user interface of the detected device to display one or more offers for products and/or services of the entity.

Furthermore, when a device signature of a detected device does not initially match a device signature on the cleared list, the system may determine that the detected device is subsequently associated with a valid transaction with the entity, and therefore places the detected device signature on the cleared list for future interactions. Additionally, the system may determine that the detected device is associated with a user that is in good standing with the entity, and therefore the system may place the detected device signature on the cleared list.

Upon determining that the device signature is associated with malfeasance, the system may automatically store information associated with the detection (e.g., the time of detection, the location of the detection, other device information, information associated with a user associated the device, and the like) in a database for immediate or periodic assessment and/or review by a specialist of the entity. In some embodiments, the system immediately transmits information associated with the detection of the device signature associated with malfeasance to the entity system 110 and/or the specialist device system 120 such that these systems 110, 120 may take appropriate action.

Furthermore, the process 200 may include block 212, where the system provides a notification to a malfeasance specialist (e.g., specialist 130) of a presence of the first device at the first location. The notification may comprise an alert along with pertinent information to aid the specialist in determining an appropriate action. The alert may comprise displaying a visual notification (e.g., a pop-up message, emitting a light signal, changing a color of an icon on a display, and the like) on a device of the specialist via a specialist device system (e.g., specialist device system 120). In some embodiments, the system may alert the specialist by emitting an audible alarm from speakers on a device of the specialist. The audible alarm may be different for different malfeasance types (e.g., one beep for a first malfeasance type, two beeps for a second malfeasance type). The audible alarm may comprise audible words that alert the specialist to the detection of a device associated with malfeasance, and possibly any other information that would be useful to the specialist in determining an appropriate action.

The notification to the specialist may include any additional information related to the device signature associated with malfeasance (e.g., the type of malfeasance that the device signature is associated with, information about a user associated with the device signature, a last known occurrence of the malfeasance associated with the device signature, and the like) such that the specialist may determine an appropriate action. In some embodiments, the system may provide suggested actions based on the additional information related to the device signature associated with malfeasance so the specialist has quick guidelines to follow. Examples of actions that may be taken by the specialist and/or the system include, but are not limited to intercepting the user associated with the device signature, alerting employees of the entity of the detection of the device signatures associated with malfeasance, requiring the user associated with the device signature to provide a more stringent level of authorization credentials than is ordinarily required by the entity, and the like. In some embodiments, no action is required by the specialist as the associated malfeasance is not expected at the current location and/or time.

In one embodiment, the system and/or the malfeasance specialist may require every transaction or transfer of personal information in the surrounding location to have a heightened level of security. For example, customers of the entity may normally simply need to input a passcode to make a transaction, access a wireless network, or the like. Once the system has detected a device signature associated with malfeasance, the system may require every customer to input both the passcode and a predetermined security question before the customers may conduct the transactions or access the wireless networks. As such, the system may help protect other customers from the malfeasance associated with the detected device signature.

Overall, the process 200 may assist a specialist in maintaining awareness of any detectable device signatures that are associated with malfeasance and allow the specialist to take an appropriate action in a timely manner.

FIG. 3 illustrates an example of a display 300 of the specialist device for notifying the specialist of an identification of a device signature associated with a malfeasance. The display 300 may include a "notification of a malfeasance" 302, a "type of malfeasance" 304, a "device signature" 306, "device information" 308, "user information" 310, a first action (i.e., Action 1) 312, and a second action (i.e., Action 2) 314. As mentioned before with respect to FIG. 2, the specialist device may also comprise hardware of a speaker and/or a light emitting component such that the specialist device may emit an audible alert and/or present a visual alert in conjunction with the rest of the specialist notification as described herein. Overall, through the display 300, the specialist will be presented with the information necessary to make an appropriate action decision in response to the determination that a device signature associated with malfeasance has been detected.

In some embodiments, the notification of a malfeasance 302 is the same notification of the malfeasance as described in block 212 of FIG. 2. This notification of the malfeasance section 302 may be a simple message stating that a device signature associated with malfeasance has been detected in a first location. In some embodiments, the notification of the malfeasance may include an alert level based on an urgency for the specialist to take an action due to the detected device signature associated with malfeasance. For example, the system may present a low level of urgency for minor malfeasance types and present a high level of urgency for major malfeasance types. Generally, the notification of malfeasance 302 is configured to gain the attention of the specialist and lets the specialist understand basic information regarding the detected device signature associated with malfeasance.

The type of malfeasance 304 provides information about the type of malfeasance that is associated with the detected device signature. As mentioned before, multiple types of malfeasance may be monitored, and each type of malfeasance may require a different responsive action (or inaction) based on certain factors. Therefore, presenting the type of malfeasance 304 associated with the detected device signature is helpful to the specialist in understanding the situation and what actions may need to be taken. In some embodiments, multiple types of malfeasance are associated with the detected device signature. In such embodiments, the type of malfeasance 304 section of the display 300 may present each type of malfeasance.

The device signature 306 section may provide the detected device signature associated with the notification of malfeasance 302. This information may be useful to the specialist in identifying which device in the location is has the device signature associated with malfeasance. Additionally, this information may allow the specialist to store and/or compare the device signature with other device signatures associated with the user and/or malfeasance.

The device information 308 section may comprise information associated with a device associated with the detected device signature. The device information 308 may comprise the type of device, a name or other identifying information of a user of the device, the last known time that the device was detected in this location, the last known time that the device was located in any location of the entity, and the like.

The user information 310 section may comprise information associated with a user that is associated with the detected device signature. This user may be an owner or possessor of the device that has the detected device signature. The user information 310 may be any information about the user that would be helpful to the specialist in identifying the user and/or determining an appropriate action. For example, the user information 310 may comprise a name of the user, any aliases of the user, any malfeasance associated with the user (e.g., malfeasance associated with the user that is in addition to the malfeasance associated with the device signature), an address of the user, account information of the user with the entity, and the like.

Finally, Action 1 312 and Action 2 314 show actions available to the specialist with regard to the notification of malfeasance 302. These actions 312, 314 may be suggested actions, common actions, or recent actions that the specialist may select or undertake in response to the notification from the system. Examples of actions 312 and 314 that may be displayed include, but are not limited to confronting the user, contacting an authority (e.g., a higher-level specialist, the police, a regulatory body, and the like), requiring the user to present a higher level of authentication credentials than normal, take no action, and the like. While two action sections 312, 314 are presented on the current display 300, it should be known that any number of actions could be presented on the display 300. For example, the system may identify three suggested actions and therefore presents all three suggested actions to the specialist on the display 300.

In some embodiments, the specialist may select one or more of the actions 312, 314 to initiate an action in response to the notification display 300. For example, the specialist may press a button or touchscreen area associated with Action 1 312 to automatically contact a regulatory body associated with the malfeasance. In some embodiments, the specialist may select one of the Actions 312, 314 to log a selected action with the system for future analysis. For example, the specialist may determine that confronting the user 150 is the appropriate action and therefore selects the respective action from the display 300. The system may then store the action decision of the specialist in a database such that the selected action may be presented to a specialist if the device signature is detected by the system again.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with notifying a specialist of a malfeasance detection based on identification of a device signature.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for notifying a specialist of a malfeasance detection based on identification of a device signature, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 6952US1.014033.2574 | 14/987,746 | MOBILE APPLICATION CONFIGURATION BASED ON GEOGRAPHIC AND TRANSACTION HISTORY CONTEXT | Concurrently herewith |
| 6954US1.014033.2575 | 14/987,042 | WORK FLOW SCHEDULE RECONCILIATION AND DATA PUSH | Concurrently herewith |
| 6956US1.014033.2577 | 14/987,714 | RECURRING EVENT ANALYSES AND DATA PUSH | Concurrently herewith |
| 6953US1.014033.2578 | 14/987,696 | ALTERNATIVE CHANNEL SELECTION BASED ON PREDICTIVE WORK FLOW | Concurrently herewith |

What is claimed is:

1. A system for notifying a malfeasance specialist of a malfeasance detection based on identification of a device signature, said system comprising:

one or more memory devices having computer readable program code stored thereon;
a communication device; and
one or more processing devices operatively coupled to the one or more memory devices, wherein the one or more processing devices are configured to execute the computer readable program code to:
identify device signatures of a plurality of devices associated with malfeasance;
store the device signatures associated with malfeasance in a database;
monitor a geographical location for the device signatures associated with malfeasance;
detect a presence of a first device signature in the geographical location, wherein the first device signature is associated with a first device;
compare the first device signature with the stored device signatures associated with malfeasance;
determine, based on the comparison, that the first device signature matches at least one of the stored device signatures associated with malfeasance; and
in response to determining that the first device signature matches at least one of the stored device signatures associated with malfeasance, provide a notification to a malfeasance specialist of a presence of the first device at the geographical location.

2. The system of claim 1, wherein monitoring the geographical location for device signatures comprises pinging the geographical location to detect mobile device signatures currently present in the geographical location.

3. The system of claim 1, wherein monitoring the geographical location for device signatures comprises searching for card signatures of a plurality of cards located in the geographical location with one or more NFC readers located in the geographical location.

4. The system of claim 1, wherein providing the notification to the malfeasance specialist comprises displaying the notification on a specialist device associated with the malfeasance specialist.

5. The system of claim 1, wherein providing the notification to the malfeasance specialist comprises emitting an audible alarm from a specialist device associated with the malfeasance specialist.

6. The system of claim 1, wherein the one or more processing devices are configured to execute the computer readable program code to prompt a user associated with the first device to provide a higher level of authorization credentials than an ordinary level of authorization credentials.

7. A computer program product for notifying a malfeasance specialist of a malfeasance detection based on identification of a device signature, the computer program product comprising at least one non-transitory computer readable medium comprising computer readable instructions, the instructions comprising instructions for:
identifying device signatures of a plurality of devices associated with malfeasance;
storing the device signatures associated with malfeasance in a database;
monitoring a geographical location for the device signatures associated with malfeasance;
detecting a presence of a first device signature in the geographical location, wherein the first device signature is associated with a first device;
comparing the first device signature with the stored device signatures associated with malfeasance;
determining, based on the comparison, that the first device signature matches at least one of the stored device signatures associated with malfeasance; and
in response to determining that the first device signature matches at least one of the stored device signatures associated with malfeasance, providing a notification to a malfeasance specialist of a presence of the first device at the geographical location.

8. The computer program product of claim 7, wherein monitoring the geographical location for device signatures comprises pinging the geographical location to detect mobile device signatures currently present in the geographical location.

9. The computer program product of claim 7, wherein monitoring the geographical location for device signatures comprises searching for card signatures of a plurality of cards located in the geographical location with one or more NFC readers located in the geographical location.

10. The computer program product of claim 7, wherein providing the notification to the malfeasance specialist comprises displaying the notification on a specialist device associated with the malfeasance specialist.

11. The computer program product of claim 7, wherein providing the notification to the malfeasance specialist comprises emitting an audible alarm from a specialist device associated with the malfeasance specialist.

12. The computer program product of claim 7, wherein the computer readable instructions further comprise instructions for prompting a user associated with the first device to provide a higher level of authorization credentials than an ordinary level of authorization credentials.

13. A computer implemented method for notifying a malfeasance specialist of a malfeasance detection based on identification of a device signature, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
identifying device signatures of a plurality of devices associated with malfeasance;
storing the device signatures associated with malfeasance in a database;
monitoring a geographical location for the device signatures associated with malfeasance;
detecting a presence of a first device signature in the geographical location associated with a first device;
comparing the first device signature with the stored plurality of device signatures associated with malfeasance;
determining, based on the comparison, that the first device signature matches at least one of the stored device signatures associated with malfeasance; and
in response to determining that the first device signature matches at least one of the stored device signatures associated with malfeasance, providing a notification to a malfeasance specialist of a presence of the first device at the geographical location.

14. The computer implemented method of claim 13, wherein monitoring the geographical location for device signatures comprises pinging the geographical location to detect mobile device signatures currently present in the geographical location.

15. The computer implemented method of claim 13, wherein monitoring the geographical location for device signatures comprises searching for card signatures of a plurality of cards located in the geographical location with one or more NFC readers located in the geographical location.

16. The computer implemented method of claim 13, wherein providing the notification to the malfeasance specialist comprises displaying the notification on a specialist device associated with the malfeasance specialist or emitting an audible alarm from the specialist device.

17. The computer implemented method of claim 13, further comprising prompting a user associated with the first device to provide a higher level of authorization credentials than an ordinary level of authorization credentials.

* * * * *